(12) United States Patent
Poola et al.

(10) Patent No.: US 10,505,826 B2
(45) Date of Patent: Dec. 10, 2019

(54) STATISTICAL PATTERN CORRELATION OF EVENTS IN CLOUD DEPLOYMENTS USING CODEBOOK APPROACH

(71) Applicant: ORACLE INTERNATIONAL CORPORATION, Redwood Shores, CA (US)

(72) Inventors: Thyagaraju Poola, Sunnyvale, CA (US); Vladimir Volchegursky, Redwood City, CA (US); Manas Goswami, San Ramon, CA (US); Janet Kay Bacon, Golden, CO (US); Venkata Ramana Karpuram, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 604 days.

(21) Appl. No.: 14/844,900

(22) Filed: Sep. 3, 2015

(65) Prior Publication Data
US 2016/0094422 A1    Mar. 31, 2016

Related U.S. Application Data

(60) Provisional application No. 62/056,320, filed on Sep. 26, 2014.

(51) Int. Cl.
| | | |
|---|---|---|
| *H04L 29/08* | (2006.01) | |
| *H04L 12/26* | (2006.01) | |
| *H04L 12/24* | (2006.01) | |

(52) U.S. Cl.
CPC ............ *H04L 43/045* (2013.01); *H04L 29/08* (2013.01); *H04L 43/067* (2013.01); *H04L 67/10* (2013.01);
(Continued)

(58) Field of Classification Search
CPC ....... H04L 43/045; H04L 43/06; H04L 41/12; H04L 67/10; H04L 47/27; H04L 43/067;
(Continued)

(56) References Cited

U.S. PATENT DOCUMENTS

| | | | | |
|---|---|---|---|---|
| 5,349,550 A | * | 9/1994 | Gage ...................... | G06F 17/15 708/422 |
| 8,862,971 B1 | * | 10/2014 | Chan .................... | H04B 1/7085 714/795 |

(Continued)

OTHER PUBLICATIONS

The correlation Coefficient: Author: Bruce Ratner et al. Publisher: SpringerLink—Journal of Targeting, Measurement and Analysis for Marketing Jun. 2009, vol. 17, Issue 2 p. 139-142.*

*Primary Examiner* — Backhean Tiv
*Assistant Examiner* — Mehulkumar J Shah
(74) *Attorney, Agent, or Firm* — Tarolli, Sundheim, Covell & Tummino LLP

(57) ABSTRACT

Correlations between patterns of events generated by various separate components within a cloud deployment are statistically determined. The determinations of the correlations can be based on dependencies between the components as indicated by a system topology graph including the components. The patterns correlated can be patterns of events from event streams generated by monitoring systems that monitor the components. The events in the event streams can represent changes over time in component state, behavior, or problem occurrence. Because the quantity of components within such a cloud deployment can be enormous, the quantity of events generated by the monitoring systems over a significant period of time can be voluminous.

21 Claims, 8 Drawing Sheets

(52) U.S. Cl.
CPC .......... *H04L 67/1002* (2013.01); *H04L 41/12* (2013.01); *H04L 41/22* (2013.01); *H04L 43/04* (2013.01)

(58) Field of Classification Search
CPC ......... H04L 43/04; H04L 41/22; H04L 12/26; H04L 29/08; H04L 12/807; H04L 12/24; H04L 29/08072; H04L 29/06; H04L 43/00; H04L 12/2602
USPC .............. 709/224; 340/3.1; 370/252; 714/39
See application file for complete search history.

(56) References Cited

U.S. PATENT DOCUMENTS

| | | |
|---|---|---|
| 9,244,978 B2 | 1/2016 | Alves et al. |
| 9,495,143 B2 | 11/2016 | Mellor et al. |
| 9,632,991 B2 | 4/2017 | Straub et al. |
| 9,706,013 B2 | 7/2017 | Schubert et al. |
| 9,723,645 B2 | 8/2017 | Wu |
| 2002/0062463 A1* | 5/2002 | Hines ........................ G06F 8/36 714/38.14 |
| 2003/0110007 A1* | 6/2003 | McGee ............... G06F 11/0709 702/179 |
| 2011/0185234 A1* | 7/2011 | Cohen ................. G06F 11/3476 714/37 |
| 2011/0246445 A1* | 10/2011 | Mishra .............. G06F 17/30516 707/713 |
| 2011/0320388 A1* | 12/2011 | Wong ................. G05B 23/0232 706/12 |
| 2012/0027083 A1* | 2/2012 | Narroschke ............ H04N 19/70 375/240.03 |
| 2013/0300591 A1* | 11/2013 | Marpe ..................... H03M 7/40 341/67 |

\* cited by examiner

FIG. 8

STATISTICAL PATTERN CORRELATION OF EVENTS IN CLOUD DEPLOYMENTS USING CODEBOOK APPROACH

CROSS-REFERENCE TO RELATED APPLICATIONS

The present application claims benefit under 35 USC 119(e) of U.S. Provisional Application No. 62/056,320, filed on Sep. 26, 2014 by Poola et. al. and entitled "Statistical Pattern Correlation of Events in Cloud Deployments Using Codebook Approach," of which the entire disclosure is incorporated herein by reference for all purposes.

BACKGROUND

Automated monitoring systems monitor information technology infrastructure along with complex software deployments, such as deployments within a cloud computing environment. The monitoring systems monitor the infrastructure and the deployments using metrics that represent the load, state, health, and behavior of each component in the infrastructure and each component of the software deployed in that infrastructure.

The software deployments can include application instances executing on nodes within the cloud computing environment. These applications can have many components. The system topology, which reflects the relationships and dependencies between these components, can be complex.

Separate monitoring systems can monitor separate components. These monitoring systems can generate events over time as a product of the monitoring that they perform relative to the components. The events can indicate changes in component state (e.g., a system component shutdown), changes in component behavior (e.g., a change in system component performance), problems affecting the component, etc.

System administrators may analyze the events generated by monitoring systems in order to discover issues in the subsystems of a cloud deployment that they manage. A monitoring system can indicate a state or status of a component through an availability metric. A monitoring system can indicate a behavior of a component through values of a metric. A monitoring system can generate a problem event in response to detecting the violation of an administrator-specified rule. Such a rule can specify, for example, that a value of a specified metric is not to exceed a specified threshold value.

A cloud computing environment can be highly dynamic. Applications deployed within the cloud computing environment can be heavily utilized. Heavy utilization can result in the consumption of system resources (e.g., storage devices such as hard disk drives can fill up). Heavy utilization also can cause hardware problems and changes in application performance. The dynamic nature of the cloud computing environment also can be due to system operators making changes to the environment. For example, system operators can deploy additional servers, shut down servers for maintenance, deploy or undeploy applications, etc. All of these situations can cause monitoring systems to produce events pertaining to affected components.

The vastness and topological complexity of a cloud deployment's infrastructure and applications contributes to the generation of huge volumes of events arising from situations that can impact numerous different subsystems within the cloud deployment. A change in one system component's state or behavior can influence several other systems components, potentially for the worse. For example, when a storage device becomes near to full, many separate components that store data to the storage device can be impacted.

Although events are designed to help system administrators to analyze and remedy problems within a cloud deployment, when very large numbers of events are being generated in relation to very many different components, the deluge of information can be difficult to comprehend. The difficulty is compounded by the dynamic nature of a cloud deployment as described above; a change in system topology or in system behavior can cause different events to be generated even in response to the same recurring problem.

BRIEF SUMMARY

According to some embodiments, correlations between patterns of events generated by various separate components within a cloud deployment are statistically determined. The determinations of the correlations can be based on dependencies between the components as indicated by a system topology graph including the components. The patterns correlated can be patterns of events from event streams generated by monitoring systems that monitor the components. The events in the event streams can represent changes over time in component state, behavior, problem occurrence, etc.

A codebook-based event correlation technique is described herein. However, unlike conventional codebook-based approaches, which encode known causes of problems, encode the problems themselves, and deterministically attempt to match a code for each problem with codes for known causes of that problem, techniques described herein can use coding in conjunction with a probabilistic mechanism that uses mutual information (e.g., entropy) to determine a strength of a correlation, which can be represented as a correlation coefficient. Techniques described herein can determine a stochastic relationship between two event sequences, which is a temporal correlation. Techniques described herein can estimate and report statistical confidences of determined correlations.

Beneficially, techniques described herein can correlate whole streams of events with each other; techniques are not limited to the correlation of single, isolated events. Because techniques described herein can encode using an event signature—a sequence of events—determined from an event stream generated by a monitoring system and selected by a user, such techniques do not require all possible sequences of events to be known a priori; separate events treated as sequences can be coded automatically based on appearances of occurrences of those events at specific times.

Additionally, techniques described herein can use a system topology to determine dependencies between system components, thereby enhancing insights into correlations between event streams generated through the monitoring of topologically related system components. Furthermore, because techniques described herein can measure and report strengths of correlations using a probabilistic mechanism rather than merely indicating the presence or absence of correlations through a deterministic mechanism, these techniques can provide superior information to a system analyst. Because techniques described herein can be agnostic to event types that a monitoring system can generate relative to any system component, such techniques can be employed

BRIEF DESCRIPTION OF THE DRAWINGS

FIG. 8 is a diagram that illustrates an example of a presentation of correlation coefficients and associated data for correlations between a primary event stream and various topologically-related secondary event streams, according to some embodiments.

DETAILED DESCRIPTION

Figure 1:
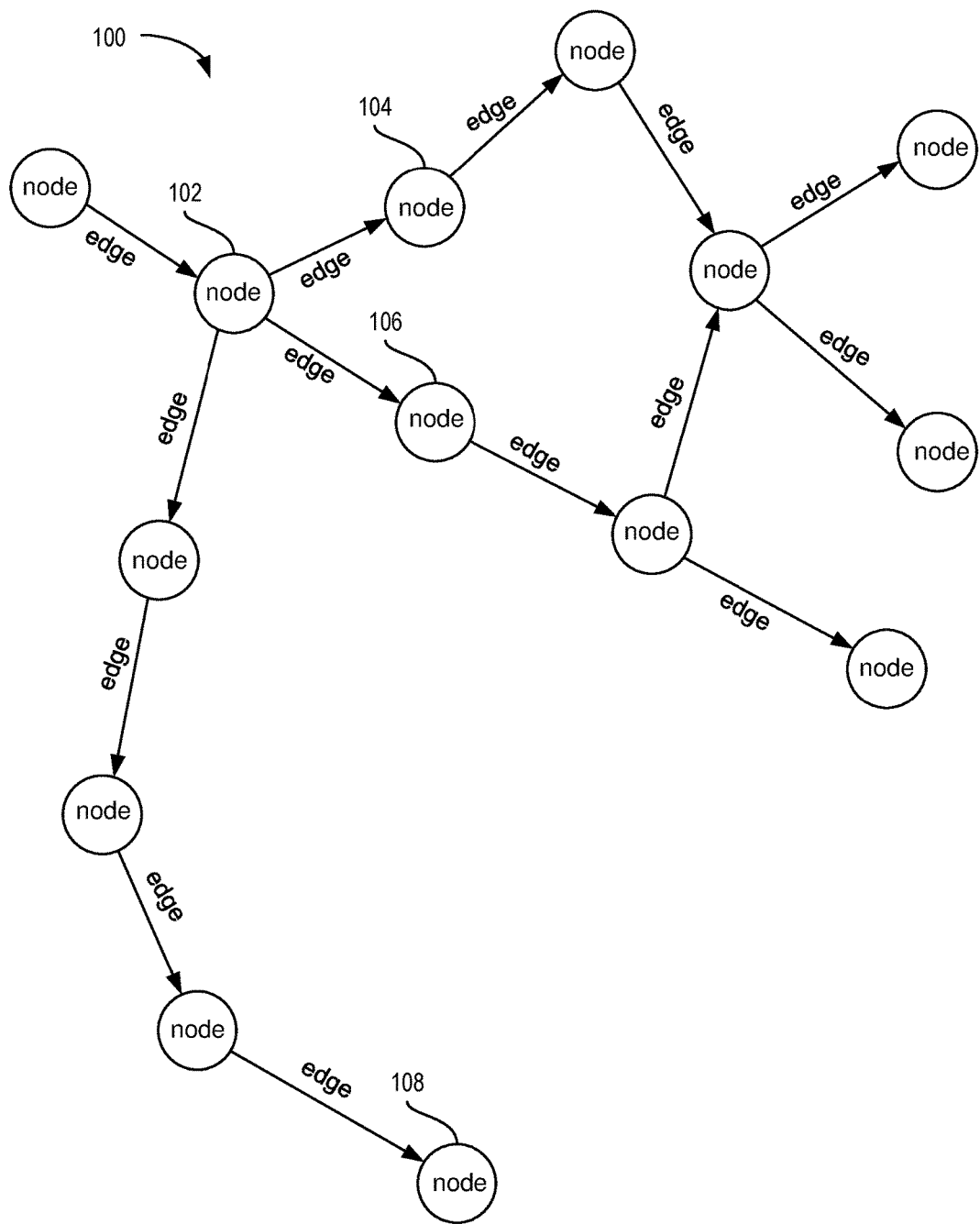
FIG. 1 is a diagram that illustrates an example of a portion of a directed graph representing a system topology, according to some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Monitoring Subsystems within a Cloud Deployment

A cloud computing environment can include a network of hardware servers, or nodes, on which various different cloud service customers' software application instances can be deployed. For example, each node can execute cloud computing host software that configures the node to be an participant in the cloud computing environment. Application instances of a customer's choice, and potentially of the customer's own creation, can be distributed among and executed by a collection of Oracle WebLogic servers executing on such nodes. The use of computing resources of a cloud computing environment can be concurrently shared among multiple unrelated customers because the cloud computing host software executing on the nodes enforces isolation between each separate customer's instances and associated data. Such sharing helps to maximize the utilization of computing resources, which theoretically decreases the cost of usage for each user.

Because a cloud computing environment can be vast, and because the quantity of nodes within that environment can be enormous, the task of ensuring that subsystems of application instances deployed in the environment are functioning properly can become complicated. In order to ease the task of shepherding these subsystems, a cloud computing environment can include automated monitoring systems. These monitoring systems can poll or sample various components of various subsystems in order to measure metrics such as load (e.g., utilization), state (e.g., active or shutdown), health, behavior (e.g., performance or response time), or other specified aspect or attribute. Oracle Enterprise Manager is an example of a monitoring system. Enterprise Manager can exist as a service within a cloud computing environment, so that multiple unrelated customers can concurrently use its monitoring facilities in a shared manner relative to their own deployments within the environment.

Enterprise Manager includes different kinds of monitoring systems designed to monitor different kinds of subsystems and the components thereof. For example, one such monitoring system can be specifically designed to monitor a component of a middleware subsystem, while another such monitoring system can be specifically designed to monitor a component of a database subsystem. Each monitoring system can be configured to gather data relating to an associated monitored subsystem component in real-time. Each monitoring system can continuously output this gathered data as an event stream. Monitoring systems can sample component data at different frequencies.

As is mentioned above, the vastness of a deployment within a cloud computing environment can make it even more difficult to detect errors affecting that deployment. One approach for detecting causes of errors involves discovering correlations between the event streams produced by various monitoring systems that monitor separate subsystem components within a deployment. Because the interrelationship between these subsystem components might not be obvious, a strong correlation discovered between the event streams produced for those subsystem components can reveal how events produced by the monitoring of one subsystem component might be leading to problems occurring in another subsystem component. Although certain embodiments described herein pertain to cloud computing environments, embodiments are not limited to that context; embodiments can be implemented within any enterprise computing environment. In some embodiments, a customer's own enterprise computing environment generates events. These events then are then uploaded to a cloud computing environment operated by an organization separate from the customer's. These events can be evaluated by software executing within the cloud computing environment.

Event Types and Signatures

As is discussed above, each event in an event stream can have an event type. Some events may share the same event type. An event's type can be related to the type of the system component (e.g., database component, middleware component, etc.) for which that event is typically generated. In addition to an event type, each event can have a severity level (e.g., warning, error, critical, fatal, etc.). An event's type is separate from its severity level.

An event type can represent a type of problem. For example, an event type of an event indicating that a database server has shut down may differ from an event type of an event indicating that the database server has experienced a change in performance. One event type can correspond to performance issues, while another event type can correspond to availability issues, while another event type can correspond to errors in the collection of metric data.

In some embodiments, each event in an event stream is assigned an associated event signature. An event's event signature can include values of multiple different attributes of that event. These attributes can include (a) the identity of the "target" system component (e.g., shopping cart application) being monitored by the monitoring system that generated the event, and (b) a metric associated with the event stream into which the event was output (e.g., performance, or, more specifically, number of transactions per second), among potentially other attributes. Notably, in some embodiments, an event's signature excludes any severity level that is associated with that event. Event signatures can be used in the coding of a primary code sequence based on a primary event stream, as is discussed further below.

Depending on the event type, the event signature can include values of different kinds of attributes. For example, an "availability" event type might include a "status" attribute whose value specify whether the target component is active or shut down. The values of that "status" attribute might be part of the signatures of events of the "availability" event type but not part of signatures of events of other event types.

Event Streams and Alerts

Different event streams can measure different metrics (e.g., performance, utilization, etc). In some embodiments, each system component can be associated with multiple separate event streams relating to that component—one for each metric being measured. The events in an event stream can represent numerical values indicative of quantitative measurements, but in a system involving numerous event streams, these numerical values are often not the most immediate point of focus.

More typically, administrators of monitoring systems choose threshold levels at which various alerts are to be generated for various selected metrics. When a quantity associated with an event in an event stream measuring a particular metric meets the threshold associated with that particular metric in this manner, the monitoring system can generate an alert and output that alert as an event within the event stream. Alert events occurring within an event stream tend to attract more attention than do the underlying quantitative measurements that might be specified, obscurely, within the events of that event stream, and this tendency becomes even more pronounced with the proliferation of multiple different event streams.

Lag in Effect

A correlation between event streams can be even more difficult to detect under circumstances in which alert events evident in one event stream do not quickly follow alert events evident in another event stream. It is possible that changes in the values of some metric at a first component might produce an impact in the values of some metric at a second component only after some amount of time has passed since the changes in the values of the metric at the first component. If a pair of event streams are conceptually placed side-by-side in a manner in which the times at which their respective events occur are aligned in a timewise manner, then there might not be any apparent correlation between significant events in one event stream and significant events in the other event stream, because the significants events in these event streams might not occur at the same times even if some events actually do cause other events.

In order to compensate for the phenomenon in which a first event occurring at one component might not effect a second event at another component for an indeterminate period of time following the occurrence of the first event, techniques described herein can shift the alignment of encoded event streams multiple times and in different temporal directions while attempting to discover a possible correlation between those event streams.

Directed Graph of System Topology

In some embodiments, a directed graph of a system topology is maintained. The graph can be stored in one or more files in one or more storage devices. The nodes (also called vertices) of the graph can represent different system components. The edges of the graph generally can represent dependencies between the system components represented by the nodes that those edges connect. Applications are among the kinds of system components that nodes in the graph can represent. Dependencies can be of different varieties. For example, a first component that is deployed on a second component can have a "deployed on" variety of dependency relative to the second component. In some embodiments, any system component that receives data from another system component is deemed to depend on that other system component, although this is not necessarily an exclusive criterion.

FIG. 1 is a diagram that illustrates an example of a portion of a directed graph representing a system topology, according to some embodiments. Graph 100 includes a node 102 that represents a shopping cart application, a node 104 that represents a credit card billing application, and a node 106 that represents a parcel shipping application. Inasmuch as node 102 communicates with nodes 104 and 106, node 102 is related to nodes 104 and 106, and so edges between node 102 and each of nodes 104 and 106, indicative of these relationships, are found in graph 100.

More specifically, node 102 depends on node 104 to process payments, and node 102 depends on node 106 to handle shipping. In graph 100, edges are directed from a dependent node to the node upon which that dependent node depends. Therefore, in graph 100, edges are directed from node 102 to each of nodes 104 and 106, reflecting dependencies.

If either of nodes 104 or 106 becomes unavailable, even temporarily, then node 102 will not be able to complete some of its orders in a timely manner. The resulting reduction in orders completed over time at node 102 can be reflected within the events of an event stream being produced by a monitoring system that monitors node 102. Monitoring systems that monitor nodes 104 and 106 also can produce event streams reflecting states of those nodes. Such event streams can capture information describing when those nodes were available or unavailable. The determination of a strong correlation between certain events in these event streams and certain events in the event stream being produced by the monitoring system that monitors node 102 can help an analyst to discover the possible root cause of the reduction in orders completed over time at node 102 (though correlation does not imply causation).

Other examples of component dependencies whose existence might suggest an attempt to discover correlations between event streams generated for the involved components might be less apparent in a large cloud deployment involving multitudes of components. In the example above, the dependencies of node 102 on nodes 104 and 106 were both single-edge dependencies. In more complex examples, nodes 104 and 106 might, themselves, be dependent on other nodes, which in turn might be dependent on yet other nodes, and so on, ad nauseam. Transitively, node 102 is dependent on all of these other nodes, regardless of the degree of separation. The reduction in orders completed over time at node 102 might ultimately be caused by a node (among potentially multiple nodes) that is indirectly connected in the graph to node 102 through a chain of multiple edges connecting multiple intermediate nodes. The event streams pertaining to any of these many nodes might or might not be strongly correlated with the event stream pertaining to node 102.

Graph 100 also includes a node 108 that represents a database server. Node 102 is indirectly connected by a chain of multiple directed edges, interconnecting multiple intervening nodes, to node 108. Thus, in the system topology, node 102 depends on node 108 event though node 102 is not directly connected by any single edge to node 108 in graph 100. An event produced by a monitoring system that monitors node 108 might indicate that node 108 has become unavailable (perhaps because the database server has shut down). A correlation between an event stream containing such an event with an event stream produced by a monitoring system that monitors node 102 might suggest to an analyst that problems affecting the database server might be a root cause of problems affecting the shopping cart application.

A graph of a system topology such as graph 100 can be generated in a variety of different ways. One possible way in which such a graph can be generated is through an automated process that examines relationships between system components at times that those components are deployed. Enterprise Manager provides a mechanism that automatically determines and generates a system topology graph in this manner. After the system topology graph has been generated, the various other components on which a particular component may depend can be discovered automatically by following the directed edges from that particular component's node to the other components' nodes, and from those other components' nodes to yet other components' nodes, in a recursive manner until no further directed edges can be followed in this manner.

Under some other circumstances, it can be desirable to determine the various other components that depend on a particular component. Under these circumstances, these other components can be discovered in a manner similar to the recursive manner discussed above, except that the directed edges can be followed backwards toward their origins.

Determining Component Dependencies Using System Topology

According to some embodiments, correlations between a primary event stream in which a user has expressed interest and one or more secondary event streams can be determined automatically based on a topology of a system in which components to which those event streams relate occur. Dependencies of a primary component, which might have caused a monitoring system to generate the events of the primary event stream, upon one or more secondary components, which might have caused monitoring systems to generate one or more secondary event streams, can be determined automatically using a directed graph of the topology. The dependencies can indicate which of a multitude of secondary event streams are most prudently analyzed relative to the primary event stream to discover possible correlations between those event streams.

Figure 2:
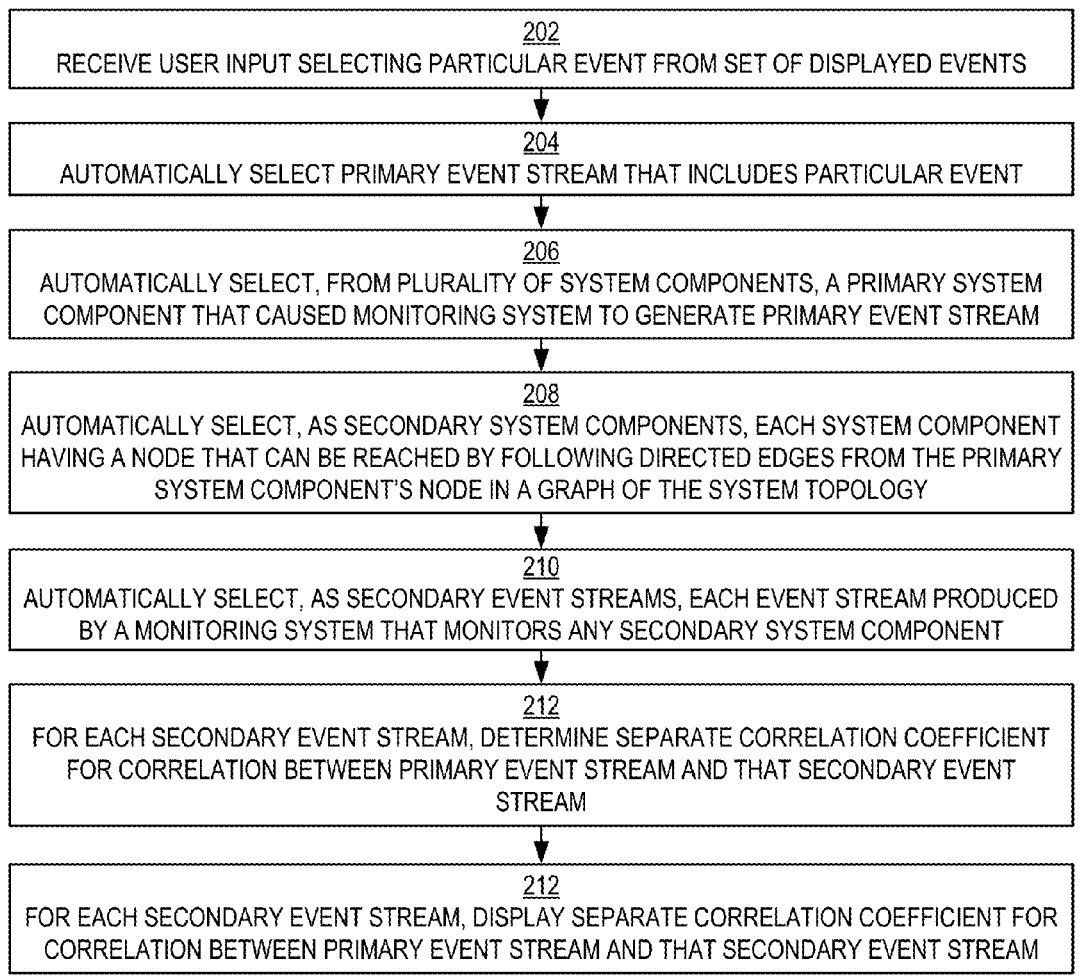
FIG. 2 is a flow diagram that illustrates a technique for automatically determining, based on a directed graph of a system topology, which secondary event streams of a plurality of secondary event streams are to be analyzed to discover possible correlations with a selected primary event stream, according to some embodiments.

FIG. 2 is a flow diagram that illustrates a technique for automatically determining, based on a directed graph of a system topology, which secondary event streams of a plurality of secondary event streams are to be analyzed to discover possible correlations with a selected primary event stream, according to some embodiments. Although FIG. 2 illustrates operations being performed in a specific order, alternative embodiments can involve additional or fewer operations being performed in the same or in different orders. The technique illustrated in FIG. 2 can be performed by a process executing on a computing device, for example.

In block 202, user input selecting a particular event from a set of displayed events is received. For example, an analyst interested in why a shopping cart application failed to complete any orders during a specified time period might view an event stream generated for that application by a monitoring system and displayed by an analytical tool. The event stream might contain events relating specifically to a performance metric (rather than other possible metrics). The event stream might include a sequence of events having different severity levels, such as "critical," "warning," and "clear." The event stream might repeat this particular sequence of events at different times of day over a multi-day time interval. Each event in this particular sequence may share the same distinct event signature event though those events have different severity levels. The analytical tool may receive, from the analyst, input that selects a particular event from the event stream.

In some embodiments, although an analytical tool may receive user input that selects a particular event, the selection can be interpreted as being a selection of the particular event's signature, which can be shared by multiple separate events in an event stream.

The analytical tool may responsively define a time window to be a specified quantity of time units centered around a time unit in which the particular event occurred (e.g., as indicated by a timestamp associated with the particular event). In some embodiments, this is the time window to which analysis of that event stream and other potentially related event streams is to be constrained.

In block 204, a primary event stream that includes the particular event is automatically selected from a plurality of event streams.

In block 206, a primary system component that caused a monitoring system to generate the primary event stream—in other words, the system component to which the particular event pertains—is automatically selected from a plurality of system components. In the foregoing example, the shopping cart application may be automatically selected.

In block 208, each of the system components having nodes that can be reached by following one or more directed edges directly or indirectly from the primary system component's node in the graph of the system topology are automatically selected to be secondary system components. The secondary system components do not need to be directly connected to the primary system component, and can be more than one degree of separation away from the primary system component.

In block 210, each of the event streams produced by any monitoring system that monitors any of the secondary system components is automatically selected to be a secondary event stream. Multiple event streams (e.g., measuring different metrics) can be associated with the same secondary system component and selected as secondary event streams. These secondary event streams are those for which the discovery of correlations with the primary event stream is to be attempted. In some embodiments, only event streams that include at least one event occurring within the same time window in which the particular event from the primary event stream are selected to be secondary event streams; event streams that contain no events in the specified time window can be ignored.

Figure 3:
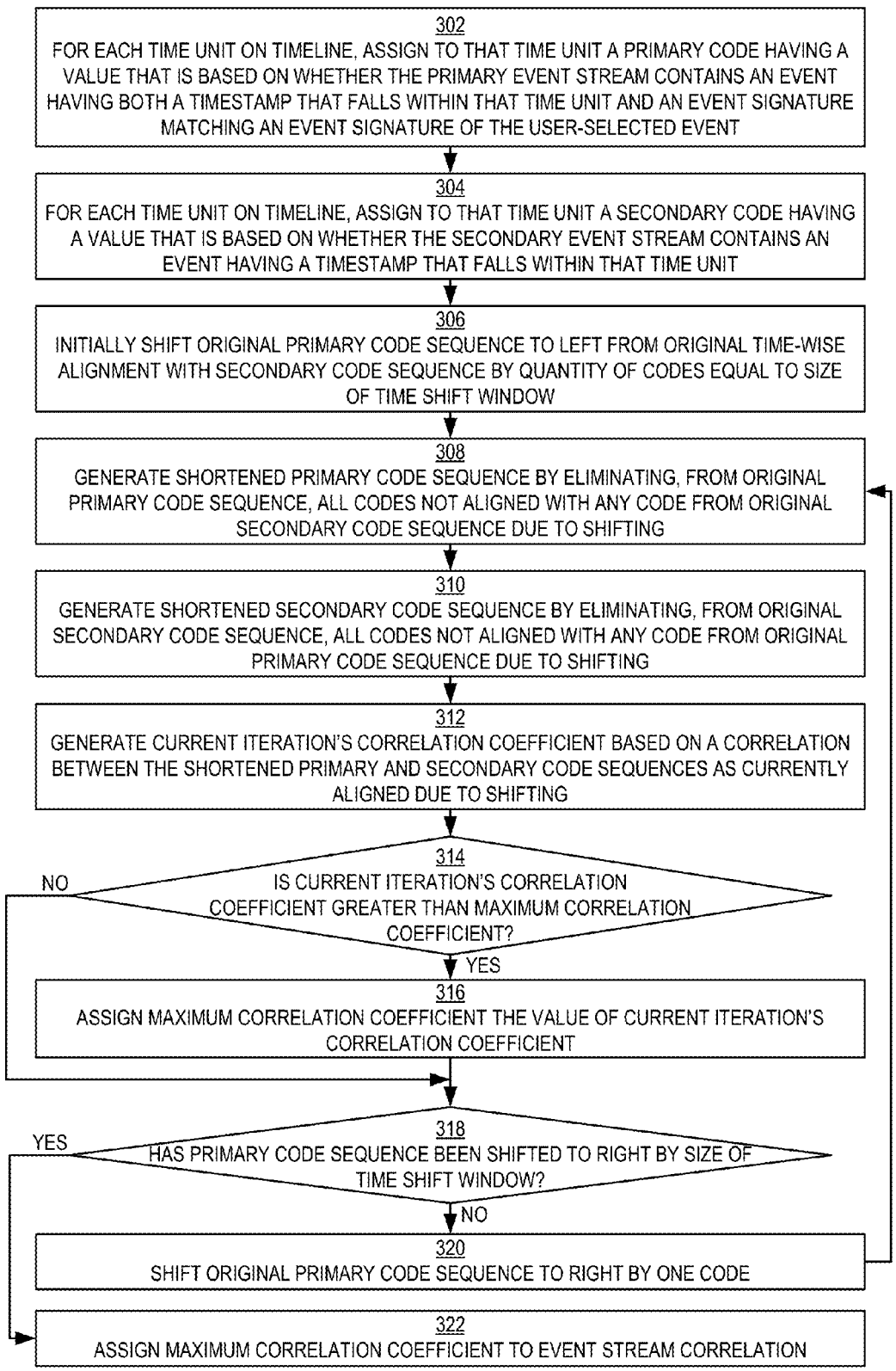
FIG. 3 is a flow diagram that illustrates a technique for determining a correlation between a primary event stream and a secondary event stream based on coding and time-shifting, according to some embodiments.

In block 212, for each of the secondary event streams selected in block 210, a correlation coefficient of a correlation between the primary event stream and that secondary event stream is determined using a technique illustrated below in connection with FIG. 3. In addition to the correlation coefficient, a P-value, correlation status (e.g., correlated or not correlated), and correlation strength (e.g., strong, medium, weak, or no correlation) can be determined based on the correlation between a secondary event stream and the primary event stream.

Figure 8:
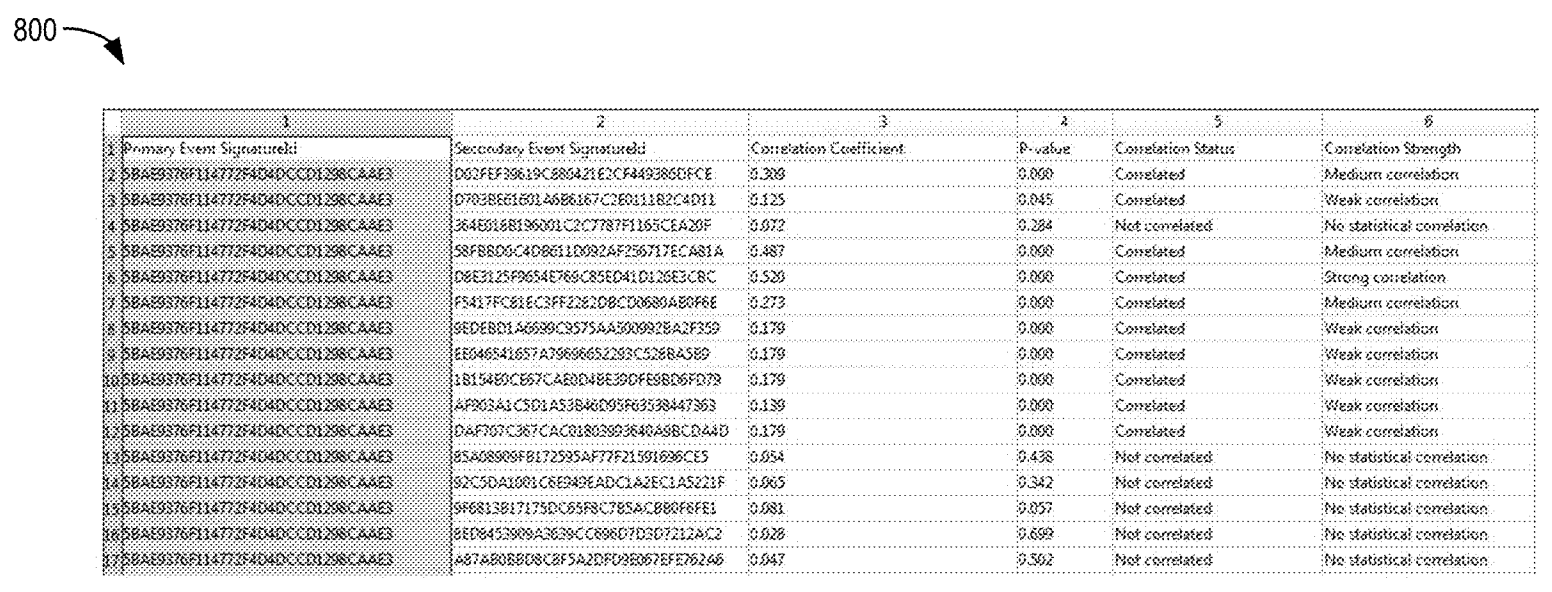

In block 214, for each of the secondary event streams selected in block 210, the correlation coefficient of the correlation between the primary event stream and that secondary event stream is displayed. In addition to each correlation coefficient, a corresponding P-value, correlation status (e.g., correlated or not correlated), and correlation strength (e.g., strong, medium, weak, or no correlation) can be displayed in association with that correlation coefficient. Thus, multiple correlation coefficients and their associated data can be displayed. FIG. 8 is a diagram that illustrates an example of a presentation 800 of correlation coefficients and associated data for correlations between a primary event stream and various topologically-related secondary event streams, according to some embodiments.

Event Stream Correlation Based on Coding and Time-Shifting

As is discussed above in connection with block 212 of FIG. 2, in some embodiments, a correlation between each secondary event stream and the primary event can be separately determined. FIG. 3 is a flow diagram that illustrates a technique for determining a correlation between a primary event stream and a secondary event stream based on coding and time-shifting, according to some embodiments. Although FIG. 3 illustrates operations being performed in a specific order, alternative embodiments can involve additional or fewer operations being performed in the same or in different orders. The technique illustrated in FIG. 3 can be performed by a process executing on a computing device, for example.

In block 302, for each time unit in a timeline that has been segmented into multiple time units, a primary code, having a value based on whether the primary event stream contains an event having both (a) a timestamp that falls within that time unit and (b) an event signature that matches the event signature of the particular event selected by a user as discussed above in connection with block 202 of FIG. 2, is associated with that time unit. In some embodiments, the quantity of time units into which the timeline is segmented is equal to the quantity of units in the time window discussed above. In some embodiments, if the primary event stream contains an event that both (a) has a timestamp that falls within a time unit and also (b) has an event signature that matches the event signature of the particular event selected by the user, then the value of the primary code associated with that time unit is 1, and otherwise 0.

In block 304, for each time unit in the timeline, a secondary code, having a value based on whether the secondary event stream contains an event having a timestamp that falls within that time unit, is associated with that time unit. If the secondary event stream contains an event having a timestamp that falls within that time unit, then the value of the secondary code associated with that time unit is 1, and otherwise 0. However, in some embodiments, events that have certain severity levels (e.g., "clear") can be excluded from an event stream for purposes of generating the primary and secondary codes discussed herein, potentially causing a primary and/or secondary code of 0 to be associated with the time unit.

The time sequence of primary codes generated in block 302 can be considered to be a primary code sequence. The time sequence of secondary codes generated in block 304 can be considered to be a secondary code sequence. Originally, each code from the primary code sequence is aligned, time-wise, with a corresponding code from the secondary code sequence. Both the primary code sequence and the secondary code sequence have separate associated entropies. Techniques described herein can determine a joint entropy for the primary and secondary code sequences. Techniques described below align the primary code sequence and the secondary code sequence, code-to-code (or corresponding time unit-to-time unit), in order to determine this joint entropy.

In some embodiments, in order to adjust for the possible effect that time lag might have upon potential correlations between the primary and secondary event streams, multiple separate correlation coefficients are determined for different time-wise alignments of the primary and secondary code sequences. A time shift window having a specified size can be defined. For example, the size of the time shift window can be set to 50. In such embodiments, over multiple iterations, the primary code sequence can be shifted to the left relative to the secondary code sequence by one code each iteration until the primary code has been shifted to the left by a quantity of codes equal to the size of the time shift window (e.g., 50 iterations given a time shift window size of 50). Additionally, in such embodiments, over multiple iterations, the primary code sequence can be shifted to the right relative to the secondary code sequence by one code each iteration until the primary code sequence has been shifted to the right by a quantity of codes equal to the size of the time shift window (e.g., 50 iterations given a time shift window size of 50). In each iteration, separate entropies and a resulting separate correlation coefficient can be determined based on that iteration's shifted alignment. A maximum correlation coefficient (across all iterations) can initially be set to zero.

Some embodiments can involve the primary code sequence being shifted to the left from its original time-wise alignment with the secondary code sequence for a specified quantity of iterations, followed by the primary code sequence being shifted to the right from its original time-wise alignment with the secondary code sequence for a specified quantity of iterations as described above. However, an embodiment disclosed below achieves equivalent results by initially shifting the primary code sequence to the left from its original time-wise alignment with the secondary code sequence by a quantity of codes (or time units) equal to the size of the time shift window (e.g., 50) in the first iteration, and then shifting the primary code sequence to the right by one code in each subsequent iteration, until in the final iteration the primary code sequence has been shifted to the right from its original time-wise alignment with the secondary code sequence sequence by a quantity of codes equal to the size of the time shift window (e.g., 50). The quantity of iterations involved is equal to twice the time shift window size plus one (e.g., 101 given a time shift window size of 50).

Thus, in block 306, the original primary code sequence is initially shifted to the left from its original time-wise alignment with the original secondary code sequence by a quantity of codes equal to the specified size of the time shift window.

In block 308, a (potentially) shortened primary code sequence is generated by eliminating, from the original primary code sequence, all codes in the original primary code sequence that are not aligned with any code from the original secondary code sequence due to the shifting. It should be noted that no actually shortening occurs during the iteration in which the code sequences are in their original (unshifted) time-wise alignment.

In block 310, a (potentially) shortened secondary code sequence is generated by eliminating, from the original secondary code sequence, all codes in the secondary code sequence that are not aligned with any code from the original primary code sequence due to the shifting. Again, it should be noted that no actually shortening occurs during the iteration in which the code sequences are in their original (unshifted) time-wise alignment.

In block 312, for a current iteration, a correlation coefficient based on a correlation between the shortened primary code sequence and the secondary code sequence, as aligned due to the current shifting, is determined. A technique for determining the correlation coefficient for the current iteration is described below in connection with FIG. 4.

In block 314, a determination is made as to whether the current iteration's correlation coefficient, calculated in block 312, is greater than the maximum correlation coefficient. If the current iteration's coefficient is greater than the maximum correlation coefficient, then the maximum correlation coefficient is updated in block 316. Otherwise, the maximum correlation coefficient remains unchanged in block 318.

In block 316, in response to a determination that the current iteration's correlation coefficient is greater than the maximum correlation coefficient, the maximum correlation coefficient is assigned the value of the current iteration's correlation coefficient. A determination of whether the final iteration has been performed is then conducted in block 318.

In block 318, a determination is made as to whether, in the current iteration, the primary code sequence has been shifted to the right from its original time-wise alignment with the original secondary code sequence by a quantity of codes equal to the specified size of the time shift window. If so, then the shifting iterations complete in block 322. Otherwise, a next shifting iteration begins in block 320.

In block 320, in response to a determination that the final iteration has not yet been performed, the next shifting iteration begins by shifting the original primary code sequence to the right from its current time-wise alignment with the original secondary code sequence by one code (or time unit). The iteration then becomes the new current iteration, and new potentially shortened code sequences are again determined back in block 308.

Alternatively, in block 322, in response to a determination that the final iteration has been performed, the correlation coefficient of the correlation between the primary event stream and the secondary event stream is assigned the maximum correlation coefficient most recently set in block 316. This correlation coefficient can be among those displayed in block 214 of FIG. 2 for the various secondary event streams. In some embodiments, a computing device stores the maximum correlation coefficient (most recently set in block 316) in association with the secondary event stream and the primary event stream. The computing device can access this maximum correlation coefficient to quantify a possible relationship between the secondary event stream and the primary event stream. The computing device can cause this maximum correlation coefficient to be displayed in response to a request to quantify the possible relationship between the secondary event stream and the primary event stream. Although embodiments discussed above involve a single maximum correlation coefficient being determined for a pair of possibly correlated event streams, in some embodiments, a range of correlations coefficients can be determined for a pair of possibly correlated event streams.

Additionally, in some embodiments, a corresponding P-value, correlation status (e.g., correlated or not correlated), and correlation strength (e.g., strong, medium, weak, or no correlation) for the correlation coefficient can be determined for display. The P-value is the probability of obtaining a test statistic result at least as extreme or as close to the one that was actually observed, assuming that the null hypothesis is true. The P-value can be determined statistically using a chi-square test. For P-values exceeding a specified threshold (e.g., 0.05), there is no strong presumption against the null hypothesis, and so the correlation status can be set to "not correlated." For other P-values, the correlation status can be set to "correlated." The correlation strength can be set based on how far the correlation coefficient is from 0, which represents no statistical correlation.

Additionally, in some embodiments, an indication of the direction and magnitude of the time shift that was operative during the iteration in which the maximum correlation coefficient was most recently set in block 316 can be stored for display in connection with that correlation coefficient. For example, the indication might be that the maximum correlation coefficient discovered for the primary and secondary code sequences occurred during an interval in which the primary code sequence was shifted left by a specified quantity of time units, suggesting that the correlation is affected by a time lag between the primary system component and the secondary system component.

Determining Correlation Coefficients from Code Sequence Pairs

Figure 4:
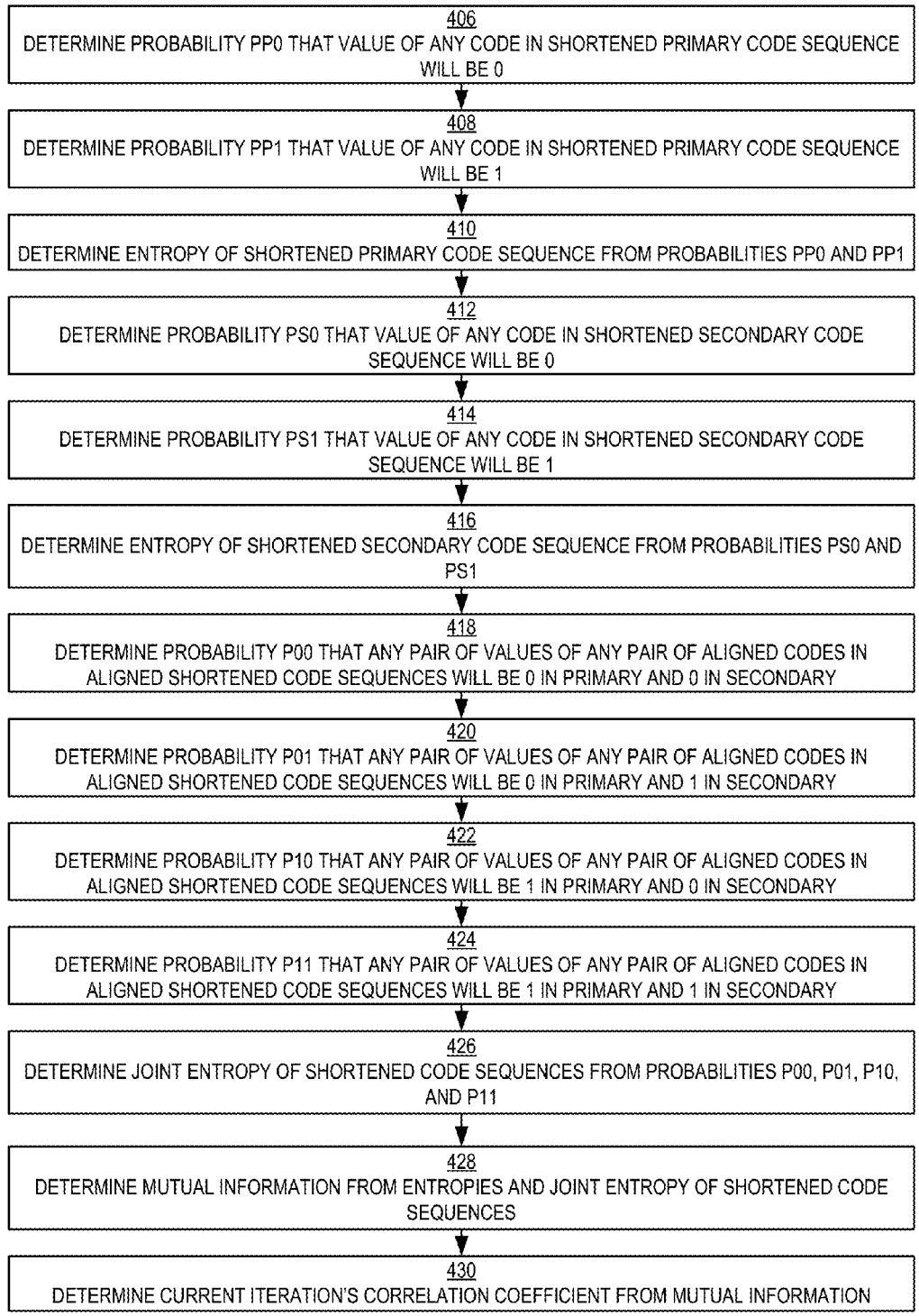
FIG. 4 is a flow diagram that illustrates a technique for determining a correlation coefficient based on a correlation between a shortened primary code sequence and a shortened secondary code sequence, as aligned in a current shifting iteration, according to some embodiments.

As is discussed above in connection with block 312 of FIG. 3, for a current iteration, a correlation coefficient based on a correlation between a shortened primary code sequence and a shortened secondary code sequence, as aligned due to the current shifting, can be determined. FIG. 4 is a flow diagram that illustrates a technique for determining a correlation coefficient based on a correlation between a shortened primary code sequence and a shortened secondary code sequence, as aligned in a current shifting iteration, according to some embodiments.

In block 406, a probability pp0 that the value of any code in the shortened primary code sequence will be 0 is determined. For example, probability pp0 can be determined by dividing the quantity of codes in the shortened primary code sequence having a value of 0 by the total quantity of codes in the shortened primary code sequence.

In block 408, a probability pp1 that the value of any code in the shortened primary code sequence generated in block 402 will be 1 is determined. For example, probability pp1 can be determined by dividing the quantity of codes in the shortened primary code sequence having a value of 1 by the total quantity of codes in the shortened primary code sequence.

In block 410, an entropy of the shortened primary code sequence is determined as $H(X)=-pp0*\log(pp0)-pp1*\log(pp1)$.

Similar operations can be performed to determine the entropy of the shortened secondary code sequence. In block 412, a probability ps0 that the value of any code in the shortened secondary code sequence generated in block 404 will be 0 is determined. For example, probability ps0 can be determined by dividing the quantity of codes in the shortened secondary code sequence having a value of 0 by the total quantity of codes in the shortened secondary code sequence.

In block 414, a probability ps1 that the value of any code in the shortened secondary code sequence generated in block 404 will be 1 is determined. For example, probability ps1 can be determined by dividing the quantity of codes in the shortened secondary code sequence having a value of 1 by the total quantity of codes in the shortened secondary code sequence.

In block 416, an entropy of the shortened secondary code sequence is determined as $H(Y)=-ps0*\log(ps0)-ps1*\log(ps1)$.

In block 418, a probability p00, that any pair of values of any pair of aligned codes in the currently aligned shortened code sequences will include 0 for the aligned code from the shortened primary code sequence and 0 for the aligned code from the shortened secondary code sequence, is determined. For example, probability p00 can be determined by dividing the quantity of pairs of aligned codes in the shortened code sequences satisfying these criteria by the total quantity of pairs of aligned codes in the shortened code sequences.

In block 420, a probability p01, that any pair of values of any pair of aligned codes in the currently aligned shortened code sequences will include 0 for the aligned code from the shortened primary code sequence and 1 for the aligned code from the shortened secondary code sequence, is determined. For example, probability p01 can be determined by dividing the quantity of pairs of aligned codes in the shortened code sequences satisfying these criteria by the total quantity of pairs of aligned codes in the shortened code sequences.

In block 422, a probability p10, that any pair of values of any pair of aligned codes in the currently aligned shortened code sequences will include 1 for the aligned code from the shortened primary code sequence and 0 for the aligned code from the shortened secondary code sequence, is determined. For example, probability p10 can be determined by dividing the quantity of pairs of aligned codes in the shortened code sequences satisfying these criteria by the total quantity of pairs of aligned codes in the shortened code sequences.

In block 424, a probability p11, that any pair of values of any pair of aligned codes in the currently aligned shortened code sequences will include 1 for the aligned code from the shortened primary code sequence and 1 for the aligned code from the shortened secondary code sequence, is determined. For example, probability p11 can be determined by dividing the quantity of pairs of aligned codes in the shortened code sequences satisfying these criteria by the total quantity of pairs of aligned codes in the shortened code sequences.

In block 426, a joint entropy of the shortened primary and secondary code sequences is determined as $H(X,Y)=-p00*\log(p00)-p01*\log(p01)-p10*\log(p10)-p11*\log(p11)$.

In block 428, mutual information is determined as $I(X,Y)=H(X)+H(Y)-H(X,Y)$. In other words, the mutual information is determined as the sum of the entropies of the shortened primary and secondary code sequences minus the joint entropy of the shortened primary and secondary code sequences.

In block 430, a correlation coefficient for the current iteration is determined using the mutual information as:

$$ECC(X,Y) = \sqrt{2\left(1 - \frac{H(X,Y)}{H(X)+H(Y)}\right)}.$$

Hardware Overview

Figure 5:
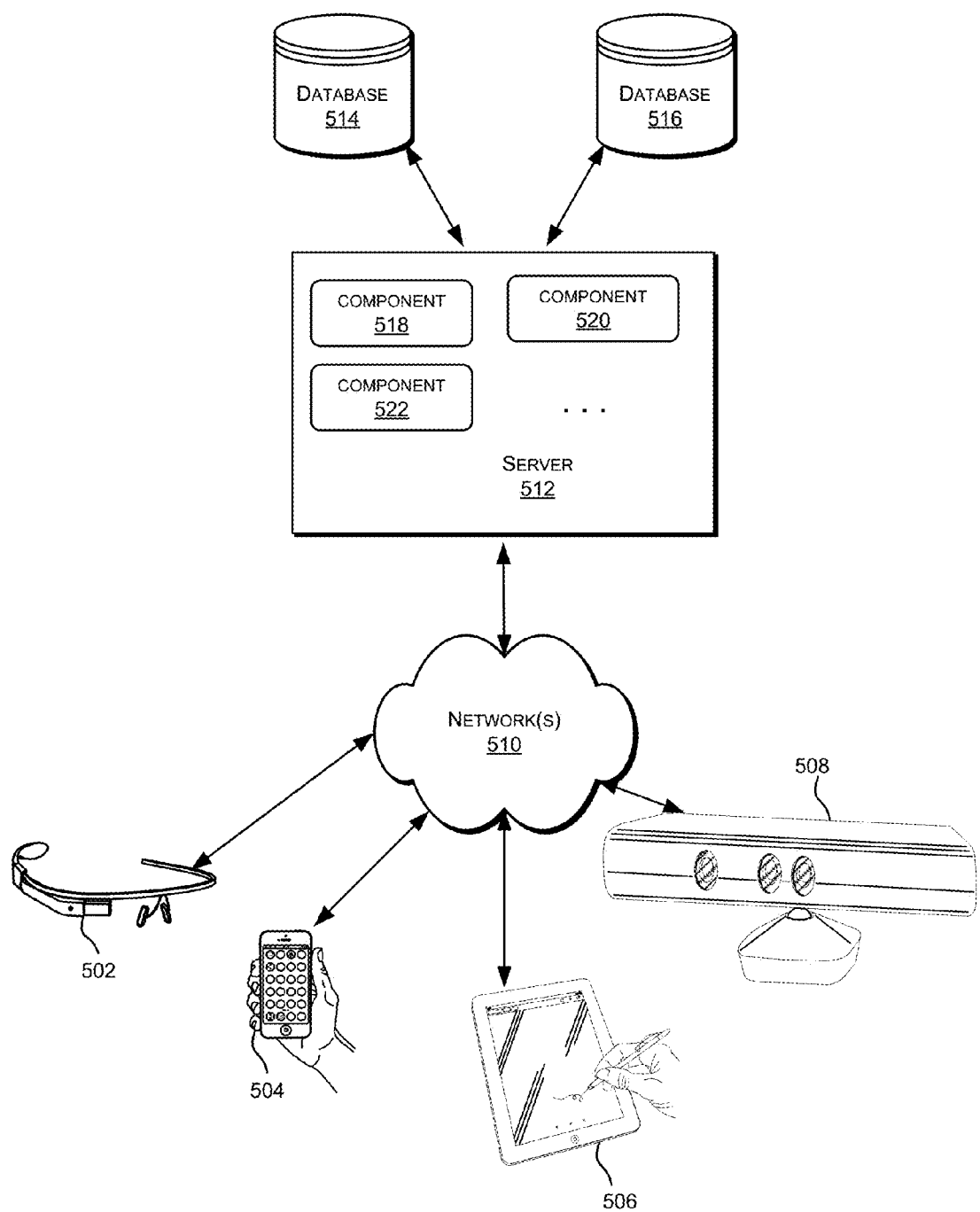
FIG. 5 depicts a simplified diagram of a distributed system for implementing one of the embodiments.

FIG. 5 depicts a simplified diagram of a distributed system 500 for implementing one of the embodiments. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications provided by one or more of the components of the system. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like. Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, which are adapted to store, update, and retrieve data in response to SQL-formatted commands.

Figure 6:
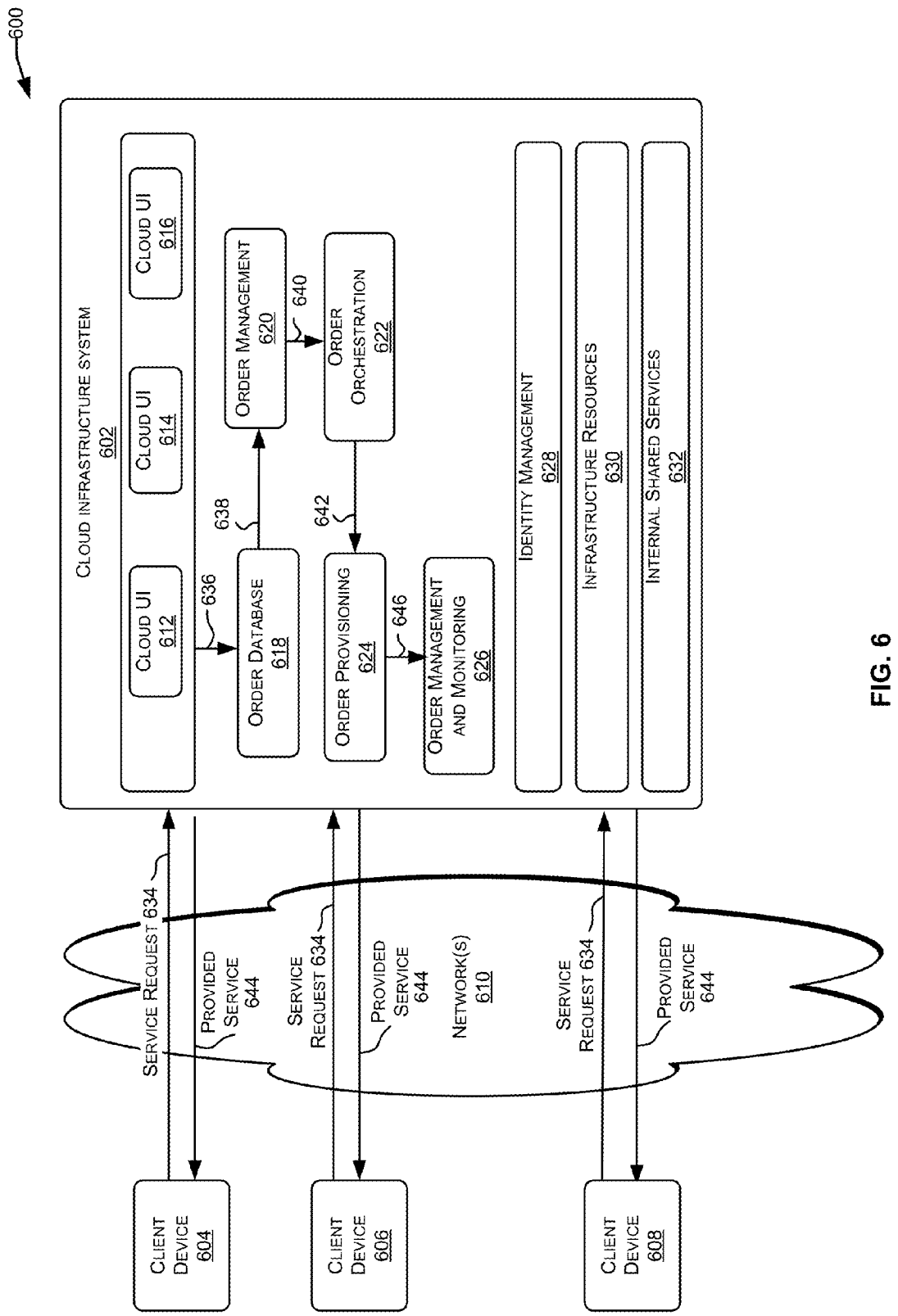
FIG. 6 is a simplified block diagram of components of a system environment by which services provided by the components of an embodiment system may be offered as cloud services, in accordance with an embodiment of the present disclosure.

FIG. 6 is a simplified block diagram of one or more components of a system environment 600 by which services provided by one or more components of an embodiment system may be offered as cloud services, in accordance with an embodiment of the present disclosure. In the illustrated embodiment, system environment 600 includes one or more client computing devices 604, 606, and 608 that may be used by users to interact with a cloud infrastructure system 602 that provides cloud services. The client computing devices may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in the figure may have other components than those depicted. Further, the embodiment shown in the figure is only one example of a cloud infrastructure system that may incorporate an embodiment of the invention. In some other embodiments, cloud infrastructure system 602 may have more or fewer components than shown in the figure, may combine two or more components, or may have a different configuration or arrangement of components.

Client computing devices 604, 606, and 608 may be devices similar to those described above for 502, 504, 506, and 508.

Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that can support data communications using any of a variety of commercially available protocols, including those described above for network(s) 510.

Cloud infrastructure system 602 may comprise one or more computers and/or servers that may include those described above for server 512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform.

In some embodiments, resources in cloud infrastructure system 602 may be shared by multiple users and dynamically re-allocated per demand. Additionally, resources may be allocated to users in different time zones. For example, cloud infrastructure system 630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 and by the services provided by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 602, and the like.

In one embodiment, as depicted in the figure, cloud management functionality may be provided by one or more modules, such as an order management module 620, an order orchestration module 622, an order-provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In exemplary operation 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI), cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

After an order has been placed by the customer, the order information is received via the cloud UIs, 612, 614 and/or 616.

At operation 636, the order is stored in order database 618. Order database 618 can be one of several databases operated by cloud infrastructure system 618 and operated in conjunction with other system elements.

At operation 638, the order information is forwarded to an order management module 620. In some instances, order management module 620 may be configured to perform billing and accounting functions related to the order, such as verifying the order, and upon verification, booking the order.

At operation 640, information regarding the order is communicated to an order orchestration module 622. Order orchestration module 622 may utilize the order information to orchestrate the provisioning of services and resources for the order placed by the customer. In some instances, order orchestration module 622 may orchestrate the provisioning of resources to support the subscribed services using the services of order provisioning module 624.

In certain embodiments, order orchestration module 622 enables the management of business processes associated with each order and applies business logic to determine whether an order should proceed to provisioning. At operation 642, upon receiving an order for a new subscription, order orchestration module 622 sends a request to order provisioning module 624 to allocate resources and configure those resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. Order orchestration module 622 may thus be isolated from implementation details, such as whether or not services and resources are actually provisioned on the fly or pre-provisioned and only allocated/assigned upon request.

At operation 644, once the services and resources are provisioned, a notification of the provided service may be sent to customers on client devices 604, 606 and/or 608 by order provisioning module 624 of cloud infrastructure system 602.

At operation 646, the customer's subscription order may be managed and tracked by an order management and monitoring module 626. In some instances, order management and monitoring module 626 may be configured to collect usage statistics for the services in the subscription order, such as the amount of storage used, the amount data transferred, the number of users, and the amount of system up time and system down time.

In certain embodiments, cloud infrastructure system 600 may include an identity management module 628. Identity management module 628 may be configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 628 may also include the management of descriptive information about each customer and about how and by whom that descriptive information can be accessed and modified.

Figure 7:
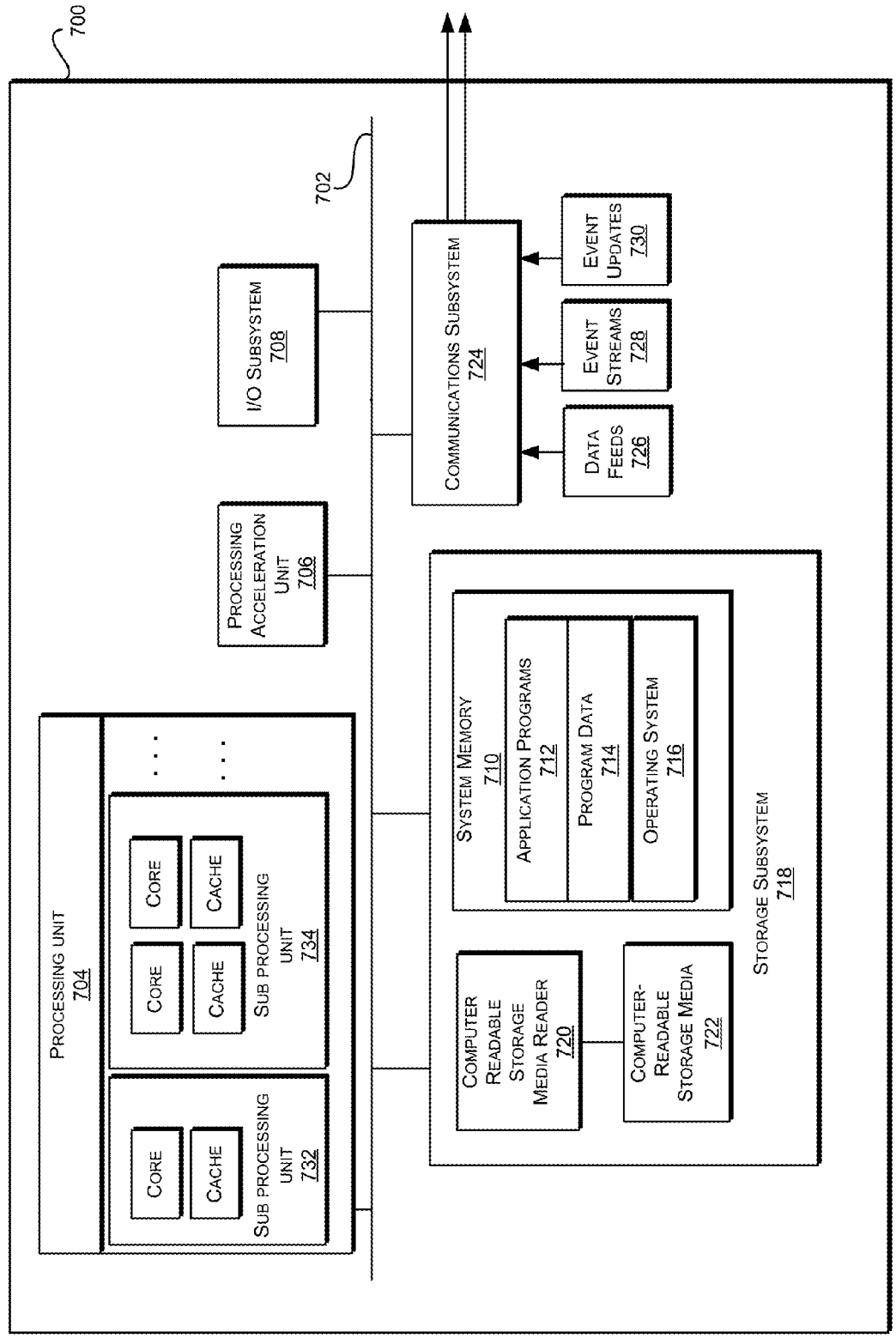
FIG. 7 illustrates an example of a computer system in which various embodiments of the present invention may be implemented.

FIG. 7 illustrates an example computer system 700 in which various embodiments of the present invention may be implemented. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 7 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like. Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    generating, by a computing device, a first sequence of events based on a first set of state information associated with a first software application on a cloud computing infrastructure;
    generating, by the computing device, a second sequence of events based on a second set of state information associated with a second software application on the cloud computing infrastructure;
    determining, by the computing device, a plurality of correlation coefficients from different alignments of the first sequence of events with the second sequence of events based upon i) entropies derived from probabilities that any code in the first sequence of events and the second sequence of events will be a first value or a second value and ii) a joint entropy of the first sequence of events and the second sequence of events derived from probabilities that pairs of codes will have certain combinations of the first value and the second value;
    selecting, by the computing device, one or more particular correlation coefficients from the plurality of correlation coefficients;
    storing, by the computing device, the one or more particular correlation coefficients in association with the second set of state information and the first set of state information;
    accessing, by the computing device, the one or more particular correlation coefficients to quantify a possible relationship between the second set of state information and the first set of state information; and provisioning, by an order provisioning module provided by the computing device, computing resources and services of the cloud computing infrastructure based on the possible quantified relationship between the second set of state information and the first set of state information in response to a request from a client device.

2. The method of claim 1, further comprising:

receiving user input that selects a particular event;

selecting, as the first set of state information, from a plurality of event streams, a particular event stream that contains the particular event;

determining an event type of the particular event, wherein multiple different events having different severity levels possess the event type;

for each particular time unit of a sequence of time units, associating the particular time unit with a primary code value that is based on whether the first set of state information contains an event that both (a) has a timestamp that falls within the particular time unit and (b) has the event type; and generating the first sequence of events based on primary code values associated with time units in the sequence of time units.

3. The method of claim 2, further comprising:

for each particular time unit of the sequence of time units, associating the particular time unit with a secondary code value that is based on whether the second sequence of events contains an event that has a timestamp that falls within the particular time unit; and generating the second sequence of events based on secondary code values associated with time units in the sequence of time units.

4. The method of claim 1, wherein determining the plurality of correlation coefficients based on different alignments of the first sequence of events with the second sequence of events comprises:

in each iteration of a plurality of iterations, shifting an alignment of the first sequence of events relative to the second sequence of events to cause different aligned pairs of codes from the first and second sequence of events to be formed;

in each iteration of the plurality of iterations, determining the joint entropy based on probabilities of occurrences of different pairs of values in the aligned pairs of codes formed in that iteration; and in each iteration of the plurality of iterations, generating a separate correlation coefficient based on the joint entropy determined during that iteration.

5. The method of claim 4, further comprising:

causing display, by the computing device, of the one or more particular correlation coefficients in response to a request to quantify the possible relationship between the second set of state information and the first set of state information;

wherein selecting the one or more particular correlation coefficients from the plurality of correlation coefficients comprises selecting, as a particular correlation coefficient, a maximum correlation coefficient that was generated in the plurality of iterations.

6. The method of claim 1, further comprising:

selecting, based on a system topology that includes the first software application upon whose monitoring the generation of the first set of state information was based, and from a plurality of components within the system topology, the second software application that has a topological relationship with the first software application; and selecting, from a plurality of event streams, as the second set of state information, an event stream that was generated based upon a monitoring of the second software application.

7. The method of claim 6, wherein selecting the second software application comprises:

following, in a directed graph representing the system topology, one or more directed edges from a node representing the primary component to a plurality of other nodes in the directed graph; and selecting, from among nodes in the directed graph, all particular nodes that can be reached by following the one or more directed edges;

wherein the second software application is a component represented by one of the particular nodes.

8. A system comprising:

one or more processors; and a memory storing instructions executable by the one or more processors to cause the one or more processors to perform operations comprising:

generating a first sequence of events based on a first set of state information associated with a first software application on a cloud computing infrastructure;

generating a second sequence of events based on a second set of state information associated with a second software application on the cloud computing infrastructure;

determining a plurality of correlation coefficients from different alignments of the first sequence of events with the second sequence of events based upon i) entropies derived from probabilities that any code in the first sequence of events and the second sequence of events will be a first value or a second value and ii) a joint entropy of the first sequence of events and the second sequence of events derived from probabilities that pairs of codes will have certain combinations of the first value and the second value;

selecting one or more particular correlation coefficients from the plurality of correlation coefficients;

storing the one or more particular correlation coefficients in association with the second set of state information and the first set of state information;

accessing the one or more particular correlation coefficients to quantify a possible relationship between the second set of state information and the first set of state information; and provisioning, by an order provisioning module, computing resources and services of the cloud computing infrastructure based on the possible quantified relationship between the second set of state information and the first set of state information in response to a request from a client device.

9. The system of claim 8, wherein the operations further comprise:

receiving user input that selects a particular event;

selecting, as the first set of state information, from a plurality of event streams, a particular event stream that contains the particular event;

determining an event type of the particular event, wherein multiple different events having different severity levels possess the event type;

for each particular time unit of a sequence of time units, associating the particular time unit with a primary code value that is based on whether the first set of state information contains an event that both (a) has a timestamp that falls within the particular time unit and (b) has the event type; and generating the first sequence of events based on primary code values associated with time units in the sequence of time units.

10. The system of claim 9, wherein the operations further comprise:

for each particular time unit of the sequence of time units, associating the particular time unit with a secondary code value that is based on whether the second set of state information contains an event that has a timestamp that falls within the particular time unit; and generating the second sequence of events based on secondary code values associated with time units in the sequence of time units.

11. The system of claim 8, wherein determining the plurality of correlation coefficients based on different alignments of the first sequence of events with the second sequence of events comprises:

in each iteration of a plurality of iterations, shifting an alignment of the first sequence of events relative to the second sequence of events to cause different aligned pairs of codes from the first and second sequence of events to be formed;

in each iteration of the plurality of iterations, determining the joint entropy based on probabilities of occurrences of different pairs of values in the aligned pairs of codes formed in that iteration; and in each iteration of the plurality of iterations, generating a separate correlation coefficient based on the joint entropy determined during that iteration.

12. The system of claim 11, wherein the operations further comprise:

causing display of the one or more particular correlation coefficients in response to a request to quantify the possible relationship between the second set of state information and the first set of state information;

wherein selecting the one or more particular correlation coefficients from the plurality of correlation coefficients comprises selecting, as a particular correlation coefficient, a maximum correlation coefficient that was generated in the plurality of iterations.

13. The system of claim 8, wherein the operations further comprise:

selecting, based on a system topology that includes the first software application upon whose monitoring the generation of the first set of state information was based, and from a plurality of components within the system topology, the second software application that has a topological relationship with the first software application; and selecting, from a plurality of event streams, as the second set of state information, an event stream that was generated based upon a monitoring of the second software application.

14. The system of claim 13, wherein selecting the second software application comprises:

following, in a directed graph representing the system topology, one or more directed edges from a node representing the first software application to a plurality of other nodes in the directed graph; and selecting, from among nodes in the directed graph, all particular nodes that can be reached by following the one or more directed edges;

wherein the second software application is a component represented by one of the particular nodes.

15. A non-transitory computer-readable storage memory storing instructions which, when executed by one or more processors, cause the one or more processors to perform operations comprising:

generating a first sequence of events based on a first set of state information associated with a first software application on a cloud computing infrastructure;

generating a second sequence of events based on a second set of state information associated with a second software application on the cloud computing infrastructure;

determining a plurality of correlation coefficients from different alignments of the first sequence of events with the second sequence of events based upon i) entropies derived from probabilities that any code in the first sequence of events and the second sequence of events will be a first value or a second value and ii) a joint entropy of the first sequence of events and the second sequence of events derived from probabilities that pairs of codes will have certain combinations of the first value and the second value;

selecting one or more particular correlation coefficients from the plurality of correlation coefficients;

storing the one or more particular correlation coefficients in association with the second set of state information and the first set of state information;

accessing the one or more particular correlation coefficients to quantify a possible relationship between the second set of state information and the first set of state information; and provisioning, by and order provisioning module, computing resources and services of the cloud computing infrastructure based on the possible quantified relationship between the second set of state information and the first set of state information in response to a request from a client device.

16. The non-transitory computer-readable storage memory of claim 15, wherein the operations further comprise:

receiving user input that selects a particular event;

selecting, as the first set of state information, from a plurality of event streams, a particular event stream that contains the particular event;

determining an event type of the particular event, wherein multiple different events having different severity levels possess the event type;

for each particular time unit of a sequence of time units, associating the particular time unit with a primary code value that is based on whether the first set of state information contains an event that both (a) has a timestamp that falls within the particular time unit and (b) has the event type; and generating the first sequence of events based on primary code values associated with time units in the sequence of time units.

17. The non-transitory computer-readable storage memory of claim 16, wherein the operations further comprise:

for each particular time unit of the sequence of time units, associating the particular time unit with a secondary code value that is based on whether the second set of state information contains an event that has a timestamp that falls within the particular time unit; and generating the second sequence of events based on secondary code values associated with time units in the sequence of time units.

18. The non-transitory computer-readable storage memory of claim 15, wherein determining the plurality of correlation coefficients based on different alignments of the first sequence of events with the second sequence of events comprises:

in each iteration of a plurality of iterations, shifting an alignment of the first sequence of events relative to the second sequence of events to cause different aligned pairs of codes from the first and second sequence of events to be formed;

in each iteration of the plurality of iterations, determining the joint entropy based on probabilities of occurrences of different pairs of values in the aligned pairs of codes formed in that iteration; and in each iteration of the plurality of iterations, generating a separate correlation coefficient based on the joint entropy determined during that iteration.

19. The non-transitory computer-readable storage memory of claim 18, wherein the operations further comprise:

causing display of the one or more particular correlation coefficients in response to a request to quantify the possible relationship between the second set of state information and the first set of state information;

wherein selecting the one or more particular correlation coefficients from the plurality of correlation coefficients comprises selecting, as a particular correlation coefficient, a maximum correlation coefficient that was generated in the plurality of iterations.

20. The non-transitory computer-readable storage memory of claim 15, wherein the operations further comprise:

selecting, based on a system topology that includes the first software application upon whose monitoring the generation of the first set of state information was based, and from a plurality of components within the system topology, the second software application that has a topological relationship with the first software application; and selecting, from a plurality of event streams, as the second set of state information, an event stream that was generated based upon a monitoring of the second software application.

21. The non-transitory computer-readable storage memory of claim 20, wherein selecting the second software application comprises:

following, in a directed graph representing the system topology, one or more directed edges from a node representing the first software application to a plurality of other nodes in the directed graph; and selecting, from among nodes in the directed graph, all particular nodes that can be reached by following the one or more directed edges;

wherein the second software application is a component represented by one of the particular nodes.

* * * * *